United States Patent
Bi et al.

(10) Patent No.: US 9,208,087 B2
(45) Date of Patent: Dec. 8, 2015

(54) ON-CHIP DATA CACHING METHOD AND APPARATUS

(71) Applicant: Huawei Technologies Co., Ltd., Shenzhen, Guangdong (CN)

(72) Inventors: Zixue Bi, Chengdu (CN); Hua Wei, Chengdu (CN); Chunlei Fan, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 81 days.

(21) Appl. No.: 13/687,955

(22) Filed: Nov. 28, 2012

(65) Prior Publication Data

US 2013/0282984 A1    Oct. 24, 2013

(30) Foreign Application Priority Data

Nov. 28, 2011   (CN) .......................... 2011 1 0384823

(51) Int. Cl.
*G06F 12/08*     (2006.01)
*G06F 12/12*     (2006.01)
*H04L 29/06*     (2006.01)

(52) U.S. Cl.
CPC .......... *G06F 12/0806* (2013.01); *G06F 12/121* (2013.01); *G06F 12/0804* (2013.01); *G06F 2212/174* (2013.01); *H04L 69/14* (2013.01)

(58) Field of Classification Search
CPC .............. G06F 12/0806; G06F 12/121; G06F 12/0804; G06F 2212/174; H04L 69/14
See application file for complete search history.

(56) References Cited

U.S. PATENT DOCUMENTS

| | | | | |
|---|---|---|---|---|
| 5,418,916 | A * | 5/1995 | Hall et al. | 712/228 |
| 6,701,393 | B1 * | 3/2004 | Kemeny et al. | 710/40 |
| 2001/0001873 | A1 * | 5/2001 | Wickeraad et al. | 711/136 |
| 2002/0152229 | A1 | 10/2002 | Peng | |
| 2002/0194433 | A1 * | 12/2002 | Yamazaki | G06F 12/121 711/136 |
| 2008/0215858 | A1 * | 9/2008 | Furukawa et al. | 712/220 |
| 2011/0283288 | A1 * | 11/2011 | Kurata et al. | 718/103 |

FOREIGN PATENT DOCUMENTS

| CN | 101197786 A | 6/2008 |
|---|---|---|
| CN | 1997015 B | 4/2011 |

OTHER PUBLICATIONS

Adaptive Time Stamp Mechanism, IBM Technical Disclosure Bulletin NN73122209, Dec. 1973, US.*

(Continued)

*Primary Examiner* — Reginald Bragdon
*Assistant Examiner* — Paul Knight
(74) *Attorney, Agent, or Firm* — Leydig, Voit & Mayer, Ltd.

(57) ABSTRACT

The present invention discloses a data caching method and apparatus, and relates to the field of network applications. The method includes: receiving a first data request; writing target data in the first data request into an on-chip Cache, and counting a storage time of the target data in the on-chip cache; enabling a delay expiry identifier of the target data when the storage time of the target data in the Cache reaches a preset delay time; and releasing the target data when the delay expiry identifier of the target data is in an enabled state and processing of the target data is complete.

9 Claims, 3 Drawing Sheets

(56) References Cited

OTHER PUBLICATIONS

QuickStudy: Cache Memory, by Gary H. Anthes, Computer World, Published Apr. 3, 2000.*

Lecture Notes for CMPSCI 377 Operating Systems; Prashant Shenoy; University of Massachusetts, Amherst; as found on the internet at: http://lass.cs.umass.edu/~shenoy/courses/fall08/lectures/Lec18_notes.pdf.*

* cited by examiner

ND-CHIP DATA CACHING METHOD AND APPARATUS

CROSS-REFERENCE TO RELATED APPLICATION

This application claims priority to Chinese Patent Application No. 201110384823.5, filed on Nov. 28, 2011, which is hereby incorporated by reference in its entirety.

FIELD OF THE INVENTION

The present invention relates to the field of network applications, and in particular, to a data caching method and apparatus.

BACKGROUND OF THE INVENTION

A general delay channel (delay cache) solution is widely applied in various application scenarios such as CPU design and cache. A basic idea is to put a releasable cache into a delay release channel, and when a delay expires, the cache is released and data is written into an off-chip memory. However, in network application, different flows have different bandwidths, the number of the flows is random, and the service processing time is uncertain, which result in that the general delay cache solution is not used any longer. Specifically, a requirement for the cache in the network application is that a flow greater than a configured bandwidth can surely hit the cache, which prevents high-bandwidth flows from accessing an off-chip memory frequently. This requires that every cache has approximately equal time from occupation to release (stay time), and in this period, if a same type of flow is received, the flow may hit the cache and is processed directly. In a mechanism used in a traditional delay cache, a cache that finishes processing enters a delay channel. Due to the uncertainty of the processing time, the stay time varies sharply between caches, thereby causing a certain impact on the network application.

SUMMARY OF THE INVENTION

Embodiments of the present invention provide a data caching method and apparatus. The technical solutions are as follows:

A data caching method includes:
receiving a first data request;
writing target data in the first data request into an on-chip Cache, and counting a storage time of the target data in the on-chip cache;
enabling a delay expiry identifier of the target data when the storage time of the target data in the Cache reaches a preset delay time; and
releasing the target data when the delay expiry identifier of the target data is in an enabled state and processing of the target data is complete.

A data caching apparatus includes:
a data read/write request processing module, configured to write target data in a first data request into a Cache of an on-chip storage module, where
the on-chip storage module includes the cache configured to store the target data and a delay cache module, where the delay cache module is configured to count a storage time of the target data in the Cache after the target data is written into the Cache of the on-chip storage module;
an identifier enabling module, configured to set a delay expiry identifier and a processing completion identifier for the target data when the target data is written into the Cache, where the identifier enabling module enables the delay expiry identifier when the storage time of the target data in the Cache reaches a preset delay time, and the identifier enabling module enables the processing completion identifier of the target data in the Cache when the processing of the target data is complete.

The on-chip storage module is further configured to release the target data when both the delay expiry identifier and the processing completion identifier of the target data in the Cache are in an enabled state.

Beneficial effects of the technical solutions according to the embodiments of the present invention are as follows.

The storage time of the target data in the on-chip cache is counted, and according to the counted storage time and the delay expiry identifier enabled when the storage time reaches the preset delay time, the target data is released when the processing of the target data is complete and the delay expiry identifier is in the enabled state, which change the practice of performing fixedly delaying on the target data in the prior art, greatly reduce occupied resources, and implement approximate equalization of the on-chip storage time of different data with fewer resources, while the depth of an original cache is not increased, and the performance of the cache is exerted fully, so that the data caching is more suitable for the current network application.

BRIEF DESCRIPTION OF THE DRAWINGS

To make the technical solutions according to the embodiments of the present invention or in the prior art clearer, accompanying drawings required for description of the embodiments or the prior art are briefly introduced below. Apparently, the accompanying drawings in the following descriptions are merely some embodiments of the present invention, and persons of ordinary skill in the art may further obtain other drawings from these accompanying drawings without creative efforts.

DETAILED DESCRIPTION OF THE EMBODIMENTS

To make the objectives, technical solutions, and advantages of the present invention clearer, embodiments of the present invention are further described in detail with reference to accompanying drawings.

Figure 1:
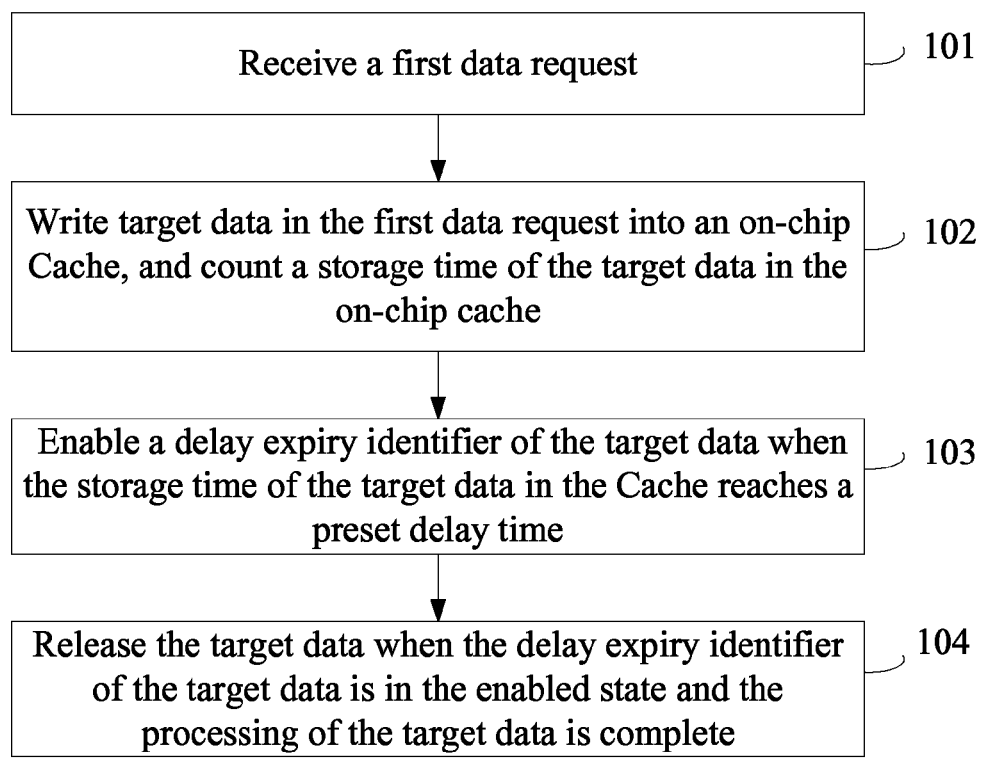
FIG. 1 is a flowchart of a data caching method according to an embodiment of the present invention.

FIG. 1 is a flowchart of a data caching method according to an embodiment of the present invention. Referring to FIG. 1, the data caching method provided in this embodiment includes:

101: Receive a first data request.

In this embodiment, the data request may be a data packet enqueue request, a flow label refers to a queue number of the packet and indicates a destination user of a current packet, and the flow label decides a destination of a flow.

102: Write target data in the first data request into an on-chip Cache, and count a storage time of the target data in the on-chip cache.

In this embodiment, a cache ID is used to identify a cache block that stores the target data, and the cache ID is stored in a delay buffer. The depth of the delay buffer is equal to a preset delay time.

103: Enable a delay expiry identifier of the target data when the storage time of the target data in the Cache reaches a preset delay time.

In this embodiment, the delay expiry identifier of the target data is enabled when the storage time of the target data in the cache reaches the depth of the delay buffer. At this time, processing of the target data may be not complete yet, and in this case, the target data is not released. The target data is not released until the processing of the target data is complete.

Further, a processing completion identifier of the target data is enabled when the processing of the target data is complete. Correspondingly, the releasing the target data when the delay expiry identifier of the target data is in an enabled state and the processing of the target data is complete includes:

releasing the target data when both the delay expiry identifier of the target data and the processing completion identifier of the target data are in the enabled state.

104: Release the target data when the delay expiry identifier of the target data is in the enabled state and the processing of the target data is complete.

Processing completion means that application that initiates the first data request has finished using the target data.

Further, the method further includes:

receiving a second data request;

when the second data request hits the target data stored in the Cache, resetting the storage time of the target data in the Cache, and setting the delay expiry identifier of the target data to a disabled state if the delay expiry identifier of the target data is in the enabled state; and re-enabling the delay expiry identifier of the target data when the storage time of the target data in the Cache reaches the preset delay time again.

The storage time of the target data in the on-chip cache is counted, and according to the counted storage time and the delay expiry identifier enabled when the storage time reaches the preset delay time, the target data is released when the processing of the target data is complete and the delay expiry identifier is in the enabled state, which change the practice of performing fixedly delaying on the target data in the prior art, greatly reduce occupied resources, and implement approximate equalization of the on-chip storage time of different data with fewer resources, while the depth of an original Cache is not increased, and the performance of the Cache is exerted fully, so that the data caching is more suitable for the current network application.

Figure 2:
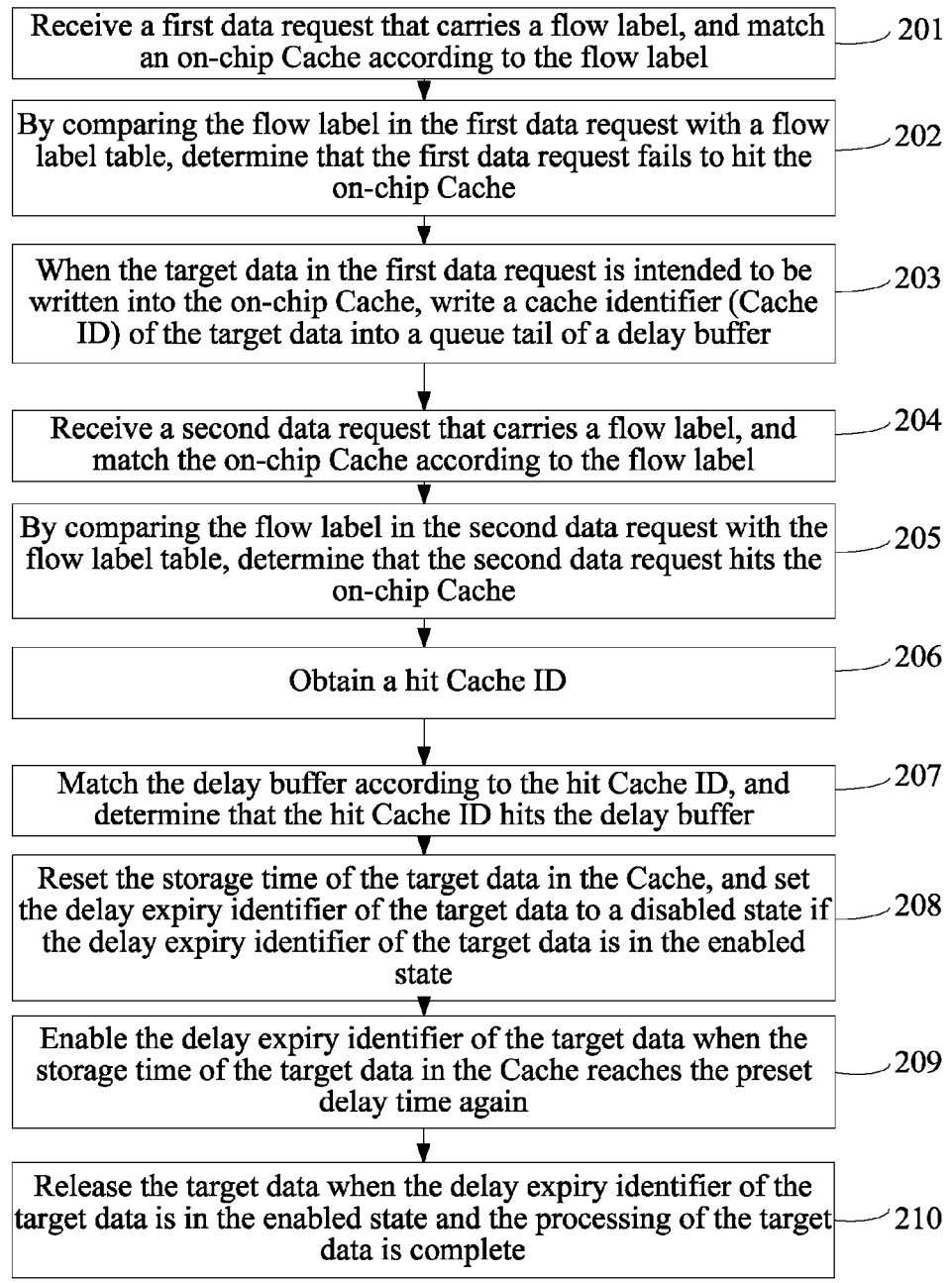
FIG. 2 is a flowchart of a data caching method according to an embodiment of the present invention.

FIG. 2 is a flowchart of a data caching method according to an embodiment of the present invention. In this embodiment, a delay time is preset by a delay buffer. Referring to FIG. 2, this embodiment specifically includes:

201: Receive a first data request that carries a flow label, and match an on-chip Cache according to the flow label.

In this embodiment, when the first data request is received, the first data request carries the flow label. Each Cache block has a data field, which is used for storing a label of a flow served by a current Cache block.

202: By comparing the flow label in the first data request with a flow label table, determine that the first data request fails to hit the on-chip Cache.

A Cache includes a data memory, a flow label table, a disable judgment logic, and a memory access controller. An input channel of the flow label table is connected to the CPU, the data memory, and the memory access controller through a main memory address bus, and an output end is connected to the disable judgment logic. The number of entries included in the flow label table is equal to the number of the Cache blocks. Each entry corresponds to a block of the Cache. The flow label table records addresses identifiers of main memory blocks to indicate a main memory block to which information currently stored in a current block belongs. When a main memory block is invoked into a certain block of the Cache, a flow label of the main memory block is written into an entry corresponding to the Cache block in the flow label table.

Through comparing whether an identifier, namely, a flow label, on the main memory address bus is equal to an identifier output by the label table, whether the data request hits the cache or not is judged. If equal, it indicates that the hit succeeds; and if not equal, it indicates that the hit fails. The success of hit means that data to be accessed is in the cache, and the failure of hit means that the data to be accessed does not exist in the cache.

Matching the cache according to the flow label is covered in the prior art, and is not repeatedly described here.

In this embodiment, description is made with reference to an example in which the first data request does not hit the cache.

203: When the target data in the first data request is intended to be written into the on-chip Cache, write a cache identifier (Cache ID) of the target data into a queue tail of a delay buffer.

In this embodiment, the delay buffer is configured to store the Cache ID. Data stored in the delay buffer may be shifted from the queue tail to a queue head according to a preset cycle. It is known to those skilled in the art that, the queue tail described in this embodiment refers to an address to which a tail pointer points, and the queue head refers to an address to which a head pointer points. When a new cache ID is written into the queue tail, both the tail pointer and the head pointer increase by 1, and it may be deemed that an originally-stored cache ID is shifted to the queue head by one address. When the delay of the Cache ID reaches the depth of the delay buffer, the head pointer points to the Cache ID, and the Cache ID may be released. In another embodiment, the tail pointer and the head pointer of the delay buffer may also be shifted by one address at a preset interval, so that the head pointer points to the Cache ID when the delay of the Cache ID reaches the depth of the delay buffer.

204: Receive a second data request that carries a flow label, and match the on-chip Cache according to the flow label.

Step 204 is the same as step 201, and is not repeatedly described here.

205: By comparing the flow label in the second data request with the flow label table, determine that the second data request hits the on-chip Cache.

206: Obtain a hit Cache ID.

In this embodiment, each cache block includes data and a Cache ID corresponding to the data. During processing of the data, the data is stored in the cache. After processing of the data, the cache does not release the data if a delay expiry identifier of the Cache ID corresponding to the data is in a disabled state. If it is determined through the comparison in step 202 that the received second data request hits the data stored in the cache, the Cache ID of the hit data is obtained.

Each cache block has two idle identifiers: a processing completion identifier "use_idle" and a delay expiry identifier "delay_idle". The use_idle is stored outside the on-chip cache. When it is requested to allocate a cache block, the use_idle of a current cache block is set to be disabled; when it is requested to end the use of the cache block, the use_idle is set to be active. The delay_idle is stored in the delay buffer. When it is requested to allocate a cache block, the delay_idle of a current cache block is set to be active; if the Cache ID in the delay buffer is hit again, the delay_idle of the Cache ID is set to be disabled. When the Cache ID is moved out of the delay buffer, the storage time of the data in the Cache reaches the preset delay time, and therefore, the delay_idle is set to be active. When both identifiers are active, the cache may release the data corresponding to the identifiers, and the current Cache ID may enter an idle pool. If the request does not hit the cache, a cache block is randomly selected from the idle pool for use.

207: Match the delay buffer according to the hit Cache ID, and determine that the hit Cache ID hits the delay buffer.

In this embodiment, the delay buffer is configured to store the Cache ID corresponding to data in the cache, and the data is still stored in the cache. The size of the data of the Cache ID is far less than the size of the data in the cache. When matching the delay buffer according to the hit Cache ID, two situations may occur: If the delay buffer has not released the hit Cache ID, the delay buffer is hit; or if the delay buffer has released the hit Cache ID, the delay buffer is not hit. It should be noted that, all data in the delay buffer has the same delay time. Because the time for processing the data in the cache is different, the situation that the delay buffer has released the Cache ID may occur when the processing time is long.

In this embodiment, description is made merely with reference to an example in which the Cache ID hits the delay buffer.

208: Reset the storage time of the target data in the Cache, and set the delay expiry identifier of the target data to a disabled state if the delay expiry identifier of the target data is in the enabled state.

In step 208, if it is determined according to a hit result that the data requested by the second data request is stored in the Cache, the storage time of the target data in the Cache is reset in order to prolong the delay of the data and reduce read of the main memory. Specifically, a resetting process includes: when the delay buffer is hit, setting the delay expiry identifier corresponding to the hit Cache ID to be disabled; when the delay buffer is full, writing the hit Cache ID into the address to which the tail pointer of the delay buffer points, increasing the head pointer and the tail pointer by 1, and setting the delay expiry identifier corresponding to the hit Cache ID to be active; and when the delay buffer is not full, writing the hit Cache ID into the address to which the tail pointer of the delay buffer points, keeping the head pointer unchanged, increasing the tail pointer by 1, and setting the delay expiry identifier corresponding to the hit Cache ID to be disabled. If a time interval between requests with the same flow label is less than the delay time of the delay buffer, the cache is surely hit.

In another embodiment, when the delay buffer is not hit and the delay buffer is full, the Cache ID is written into the address to which the tail pointer of the delay buffer points, the head pointer and the tail pointer are increased by 1, and the delay expiry identifier corresponding to the Cache ID is to be active.

When the delay buffer is not hit and the delay buffer is not full, the Cache ID is written into the address to which the tail pointer of the delay buffer points, the head pointer is kept unchanged, the tail pointer is increased by 1, and the delay expiry identifier corresponding to the Cache ID is set to be active.

In another embodiment, when the cache is not hit, it indicates that the cache stores no data corresponding to the data request or the requested data is released when the delay expires. In this case, a new Cache ID is allocated for the data request, the newly-allocated Cache ID is written into a delay release channel, that is, the delay buffer, so that the cache can be matched according to the second data request when another data request is received subsequently. Because the size of the Cache ID is very small, the depth of the delay buffer may be quite deep, so as to increase the stay time of the data.

For example, if the depth of the cache is 128 and an entry speed is FP1, average use time of each cache should be 128 cycles (a maximum processing time of the data needs to be less than or equal to 128 cycles). The depth of the delay buffer is configured to be 120, to ensure that each cache is not released until the cache has been used for at least 120 cycles (which is the stay time of the data). Because the average use time is 128 cycles, the stay time differs slightly between caches, and the performance approaches the LRU (Latest Recently Used) replacement policy, and the stay time of the data is relatively fixed. Moreover, for the cache having a depth of 128 and an entry speed of FP1, the average use time of each cache is 128 cycles, a restriction is imposed that a cache is not allowed to release until it has been used for 120 cycles, and a situation does not occur that the caches are not enough because the restriction is imposed, so the depth of the cache is not affected, and the depth of the cache is not increased.

209: Enable the delay expiry identifier of the target data when the storage time of the target data in the Cache reaches the preset delay time again.

By rewriting the cache ID into the queue tail of the delay buffer, extension of the storage time of the target data in the cache is implemented.

210: Release the target data when the delay expiry identifier of the target data is in the enabled state and the processing of the target data is complete.

It should be noted that, the releasing the target data may be passive releasing. When a third data request is received, and the third data request does not hit the cache, if it is known according to the processing completion identifier and the delay expiry identifier of the target data in the cache that the target data is releasable, the target data is released, data corresponding to the third data request is written into the cache, a cache ID is allocated for the data, and the cache ID is written into the delay buffer.

In the method provided in this embodiment, the depth of the cache and the depth of the delay buffer may be set according to actual requirements, and are not specifically limited in the embodiment of the present invention.

In another embodiment, the function of the delay buffer may be implemented by a counter. A counter is configured for each storage unit of the cache. An initial value of the counter is configured to be a stay time of data in each storage unit of the cache. If a received data request hits a certain storage unit of the cache, a corresponding counter is set to the initial value, and other counters are allowed to continue counting; and if the request does not hit the cache, a cache whose counter decreases to 0 is allocated to the current request.

The storage time of the target data in the on-chip cache is counted, and according to the counted storage time and the delay expiry identifier enabled when the storage time reaches the preset delay time, the target data is released when the processing of the target data is complete and the delay expiry identifier is in the enabled state, which changes the practice of performing fixedly delaying on the target data in the prior art; by changing types of data stored in the delay buffer and storing only a cache index of the Cache in the delay buffer, the resources occupied by the delay buffer are reduced greatly, and approximate equalization of the on-chip storage time of different data is implemented with fewer resources, while the depth of an original cache is not increased, and performance of the cache is exerted fully, and a hit rate of the cache in network application is improved, so that a hit rate of the cache in the network application is improved and the data caching is more suitable for the current network application.

Figure 3:
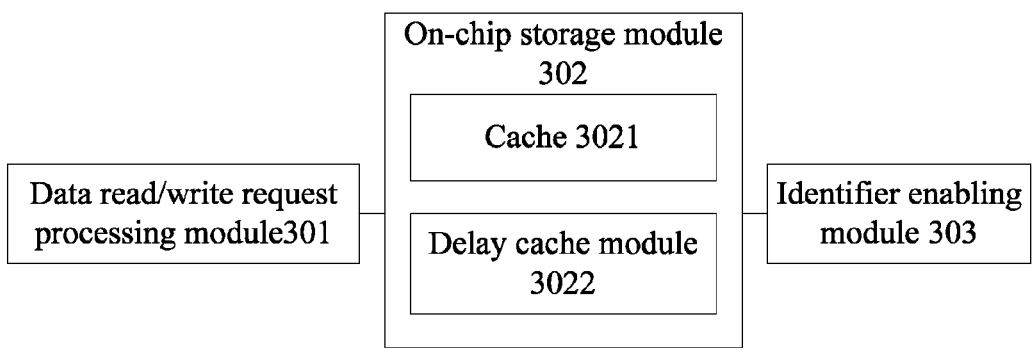
FIG. 3 is a schematic structural diagram of a data caching apparatus according to an embodiment of the present invention.

FIG. 3 is a schematic structural diagram of a data caching apparatus according to an embodiment of the present invention. Referring to FIG. 3, the apparatus in this embodiment specifically includes:

a data read/write request processing module 301, configured to write target data in a first data request into a Cache of an on-chip storage module 302, where the on-chip storage module 302 includes the cache 3021 configured to store the target data and a delay cache module 3022, where the delay cache module is configured to count a storage time of the target data in the Cache after the target data is written into the Cache of the on-chip storage module; and an identifier enabling module 303, configured to set a delay expiry identifier and a processing completion identifier for the target data when the target data is written into the Cache, where the identifier enabling module enables the delay expiry identifier when the storage time of the target data in the Cache reaches a preset delay time, and the identifier enabling module enables the processing completion identifier of the target data in the Cache when the processing of the target data is complete.

The on-chip storage module 302 is further configured to release the target data when both the delay expiry identifier and the processing completion identifier of the target data in the Cache are in the enabled state.

Figure 4:
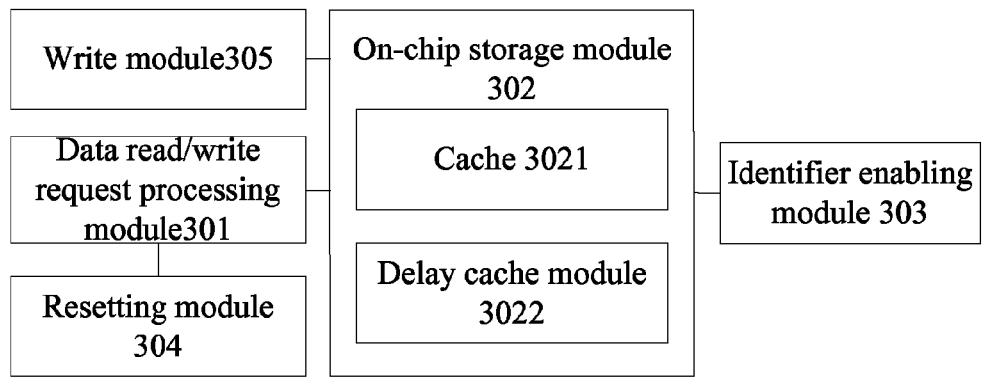
FIG. 4 is a schematic structural diagram of a data caching apparatus according to an embodiment of the present invention.

Referring to FIG. 4, the apparatus further includes:

a resetting module 304, configured to reset the storage time of the target data in the Cache when a second data request hits the target data stored in the Cache.

The identifier enabling module 303 is further configured to set the delay expiry identifier of the target data to a disabled state if the delay expiry identifier of the target data is in the enabled state.

The identifier enabling module 303 is further configured to re-enable the delay expiry identifier of the target data when the storage time of the target data in the Cache reaches the preset delay time again.

The identifier enabling module 303 is further configured to enable the processing completion identifier of the target data if the processing of the first data request is complete.

The identifier enabling module 303 is further configured to set the processing completion identifier of the target data to the disabled state when the second data request hits the target data stored in the Cache.

The apparatus further includes a write module 305, configured to write a cache identifier (Cache ID) of the target data into a queue tail of a delay buffer, when the target data in the first data request is written into the on-chip Cache.

Correspondingly, the delay cache module 3022 is specifically configured to allow the storage time of the target data in the Cache to reach the preset delay time when the Cache ID of the target data is shifted from the queue tail to a queue head in the delay buffer.

The apparatus provided in this embodiment has the same conception as that of the method embodiments. Details of a specific implementation process of the apparatus may be made reference to the method embodiment, and are not repeatedly described here.

All or part of the foregoing technical solutions provided in the embodiments of the present invention may be implemented by a program instructing relevant hardware. The program may be stored in a readable storage medium, and the storage medium may include any medium that is capable of storing program codes, such as a ROM, a RAM, a magnetic disk, or a compact disk.

The foregoing descriptions are merely exemplary embodiments of the present invention, but are not intended to limit the present invention. Any modification, equivalent replacement or improvement made without departing from the spirit and principle of the present invention shall fall within the protection scope of the present invention.

What is claimed is:

1. A data caching method, comprising:
   receiving a first data request;
   writing target data in the first data request into an on-chip Cache, and counting a storage time of the target data in the on-chip cache;
   writing a cache identifier (cache ID) of the target data to a delay buffer;
   setting a delay expiry identifier of the target data to an enabled state when the storage time of the target data in the on-chip Cache reaches a preset delay time, wherein the delay expiry identifier is stored in the delay buffer in correspondence with the cache ID of the target data; and
   releasing the target data when both the delay expiry identifier of the target data is in the enabled state and processing of the target data is completed;
   receiving a second data request;
   in response to the second data request hitting the target data stored in the on-chip Cache:
   resetting the storage time of the target data in the on-chip Cache, and
   setting the delay expiry identifier of the target data to a disabled state in the delay buffer if the delay expiry identifier of the target data is in the enabled state.

2. The data caching method according to claim 1, further comprising:
   enabling a processing completion identifier of the target data when the processing of the target data is completed;
   the releasing the target data when the delay expiry identifier of the target data is in the enabled state and the processing of the target data is completed comprises:
   releasing the target data when both the delay expiry identifier and the processing completion identifier of the target data are in the enabled state.

3. The data caching method according to claim 1, further comprising:
   re-setting the delay expiry identifier of the target data to the enabled state when the storage time of the target data in the on-chip Cache reaches the preset delay time again.

4. The data caching method according to claim 3, wherein:
   before receiving the second data request, the method further comprises:
   enabling a processing completion identifier of the target data when the processing of the first data request is completed; and
   setting the processing completion identifier of the target data to the disabled state when the second data request hits the target data stored in the on-chip Cache.

5. The data caching method according to claim 1, wherein:
   when the target data in the first data request is written into the on-chip Cache, a cache identifier (Cache ID) of the target data is written into a queue tail of a delay buffer; and
   the counting the storage time of the target data in the on-chip cache comprises:

allowing the storage time of the target data in the Cache to reach the preset delay time when the Cache ID of the target data is shifted from the queue tail to a queue head in the delay buffer.

6. A data caching apparatus, comprising:

a data read/write request processing module, configured to write target data in a first data request into a Cache of an on-chip storage module, wherein the on-chip storage module comprising the Cache is configured to store the target data and includes a delay cache module, wherein the delay cache module is configured to count a storage time of the target data in the Cache after the target data is written into the Cache of the on-chip storage module, and to write a cache identifier (cache ID) of the target data to a delay buffer; and an identifier enabling module, configured to set a delay expiry identifier and a processing completion identifier for the target data when the target data is written into the Cache, wherein the identifier enabling module enables the delay expiry identifier when the storage time of the target data in the Cache reaches a preset delay time, wherein the delay expiry identifier is stored in the delay buffer in correspondence with the cache ID of the target data, and the identifier enabling module enables the processing completion identifier of the target data in the Cache when processing of the target data is completed, wherein the on-chip storage module is further configured to release the target data when both the delay expiry identifier and the processing completion identifier of the target data in the Cache are in an enabled state;

a resetting module, configured to reset the storage time of the target data in the Cache in response to a second data request hitting the target data stored in the Cache, and wherein the identifier enabling module is further configured to set the delay expiry identifier of the target data to a disabled state in the delay buffer if the delay expiry identifier of the target data is in the enabled state.

7. The apparatus according to claim 6, wherein the identifier enabling module is further configured to re-enable the delay expiry identifier of the target data when the storage time of the target data in the Cache reaches the preset delay time again.

8. The apparatus according to claim 6, wherein the identifier enabling module is further configured to enable the processing completion identifier of the target data when the processing of the first data request is completed; and the identifier enabling module is further configured to set the processing completion identifier of the target data to a disabled state when the second data request hits the target data stored in the Cache.

9. The apparatus according to claim 6, further comprising:

a write module, configured to write a cache identifier (Cache ID) of the target data into a queue tail of a delay buffer when the target data in the first data request is written into the on-chip Cache; wherein the delay cache module is configured to allow the storage time of the target data in the Cache to reach the preset delay time when the Cache ID of the target data is shifted from the queue tail to a queue head in the delay buffer.

* * * * *